Re. 24334

Dec. 4, 1956

G. L. CRAMER ET AL 2,772,795

SELF-LOADING VEHICLE HOIST

Filed Oct. 8, 1954

INVENTOR
George L. Cramer
Amos Raffensberger
Eli R. Strine

BY

ATTORNEY

Dec. 4, 1956  G. L. CRAMER ET AL  2,772,795
SELF-LOADING VEHICLE HOIST
Filed Oct. 8, 1954  4 Sheets-Sheet 2

Fig. 4

INVENTOR
George L. Cramer
Amos Raffensberger
Eli R. Strine
BY
ATTORNEY

INVENTOR
George L. Cramer
Amos Raffensberger
Eli R. Strine

BY

ATTORNEY

United States Patent Office 2,772,795
Patented Dec. 4, 1956

2,772,795

SELF-LOADING VEHICLE HOIST

George L. Cramer, Amos Raffensberger, and Eli R. Strine, York, Pa., assignors to Side-O-Matic Unloader Corporation, York, Pa., a corporation of Pennsylvania Application October 8, 1954, Serial No. 461,262

12 Claims. (Cl. 214—75)

This invention relates to a hoist arranged to be attached to the bed of a vehicle so as to be carried thereby. More particularly, but without restriction thereto, the hoist is of the type adapted to support and move loads of material for purposes of loading the same onto and removing the same from the bed of the vehicle and, more particularly, an automobile truck. The nature of the hoist is such that it is especially adaptable to the loading and unloading of cement building blocks but, depending upon the type of load engaging means used with the hoist, said hoist may be employed for loading and unloading a wide variety of items onto and from the vehicle.

Many types of vehicle supported hoists have been developed heretofore but, particularly where said hoists were employed to load or unload items or groups of items of heavy weight, difficulty has been experienced in adequately bracing and supporting the hoist relative to the bed of the vehicle in order that the loading and unloading of heavy items might be accomplished. To provide hoists of suitable strength which were capable of handling relatively heavy loads heretofore, cumbersome and often unwieldy types of overhead superstructures and bracing means have been utilized. Some of such overhead bracing structures have been such that they extended considerably above the bed of the truck and thus handicapped the vehicle by limiting the height of doorways through which the vehicle might pass, for example.

In addition, some of the previously used hoists of the type described have been so elaborate that considerable additional weight was added to that of the vehicle, in excess of the load to be carried thereby, whereby unusually heavy capacity trucks have been required to support both the load and the hoist. This was particularly true in hoists which included overhead trackways along which carriage-supported booms were movable. Also, such elaborate types of hoists were quite expensive and effort has been made to provide simpler hoists capable of accomplishing the same purpose and suitable to handle heavy items and groups of items.

One type of hoist which has been used in order to simplify the structure has been one in which a mast has been secured to the bed of a vehicle so as to extend upward therefrom but particularly the bracing which has been required to prevent swaying or bending of the mast has been quite elaborate and extended high above the bed of the vehicle particularly for purposes of also bracing the boom which directly supported the load engaging member. Provision of such bracing mechanism also hampered the movement of the boom relative to the bed of the vehicle, whereby it was possible for the boom to move through a relatively short arc about the axis of the boom. Counterweights for the boom also have been resorted to in order to minimize bracing. Such mechanism however extensively added to the weight of the hoist as well as the dead load to be supported by the vehicle in addition to the pay load.

The present invention has been devised to overcome the difficulties and objections of similar hoists developed and used heretofore by employing a mast mounted preferably centrally of the bed of a motor truck, for example, and extending thereabove only a sufficient distance to permit the boom to clear the upper portion of a contemplated pay load. Further, the bracing mechanism is unique in that it permits a full 360° of movement of the boom about the axis of the mast, thereby interfering in no way with such movement of the boom and, further, the mounting and supporting mechanism for the boom relative to the mast is such that a minimum height of mast is required. Simple and compact means also are used to pivotally support one end of the radially extending boom for movement about the axis of the mast, said supporting means also affording substantially the entire bracing means for the boom so as to prevent the same from tilting while a load is being supported by the boom even when the load is supported by the boom adjacent the outer end thereof.

Such preferably central mounting of the mast relative to the bed of the vehicle also permits the use of a minimum length of boom while permitting the boom to be rotated to any position desired about the axis of the mast in order to dispose the outer end of the boom from either side of the vehicle or particularly from the rear end thereof, as well as permitting the boom to be rotated so that the outer end thereof is disposed over the cab of the vehicle as when the vehicle is empty, for example.

Still another unique feature of the present invention comprises the specific type of bracing means associated with the mast, said bracing means being so positioned relative to the bed of the vehicle and the mast that, in the preferred embodiment of the invention which especially is designed to accommodate cubes of cement block products, a considerable number of such cubes of cement blocks may be loaded upon the truck with substantially no wasted space between said cubes and yet adequate bracing of the mast and boom is afforded.

The power means for rotating the boom about the mast, as well as hoisting a load and moving a load longitudinally along the boom, all are of simple and compact nature conveniently arranged upon the vehicle so that the same may be accommodated by a standard type of motor truck for example without requiring a custom built frame or body.

All of the mechanism included in the present invention is of rugged and durable nature which is capable of long life and a minimum of maintenance. Further, control mechanism is included to prevent unintended excess travel or movement of the various movable members of the hoist assembly and, in the preferred embodiment of the invention, the entire apparatus of said assembly is operable by power means controlled by a preferably portable unit easily held within the hand of an operator, whereby substantially no manual operation of the apparatus is required.

Details of the invention and the advantages thereof, as well as the unique characteristics thereof, are set forth in the following specification and illustrated in the accompanying drawings forming a part thereof.

It is to be understood that the hoist comprising the present invention may be adapted to a number of types of vehicles such as railway cars, navigation vessels and road vehicles. However, to facilitate illustration and explanation of the invention, an exemplary motor truck 10 has been illustrated in Figs. 1, 4 and 5. Said truck has a conventional motor and transmission unit 12 which propels the vehicle and, said unit also furnishes power for the various operating motor units associated with the hoist assembly 14. Said assembly may be powered by any suitable means such as hydraulic motors or electric motors. In the present illustration, hydraulic power is used but it is to be understood that such illustration is not to be considered restrictive.

Assuming that hydraulic power is used to energize the various operating units of the hoist assembly in the present illustration, a hydraulic pump 16 is operated by the motor and transmission unit 12, said pump deriving hydraulic fluid from a suitable reservoir 18.

The bed 20 of the truck is supported by a conventional frame 22 and the hoist assembly is fixed to the bed 20, preferably permanently.

Figure 1:
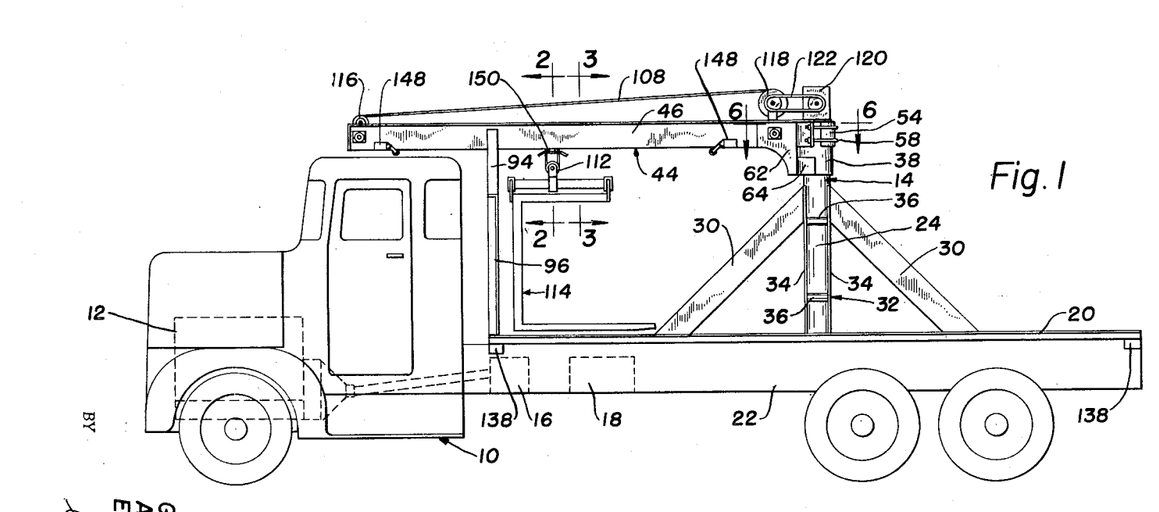
Fig. 1 is an exemplary side elevation of a motor truck having a hoist affixed thereto which embodies the principles of the present invention.
Figures 5, 6, 7:
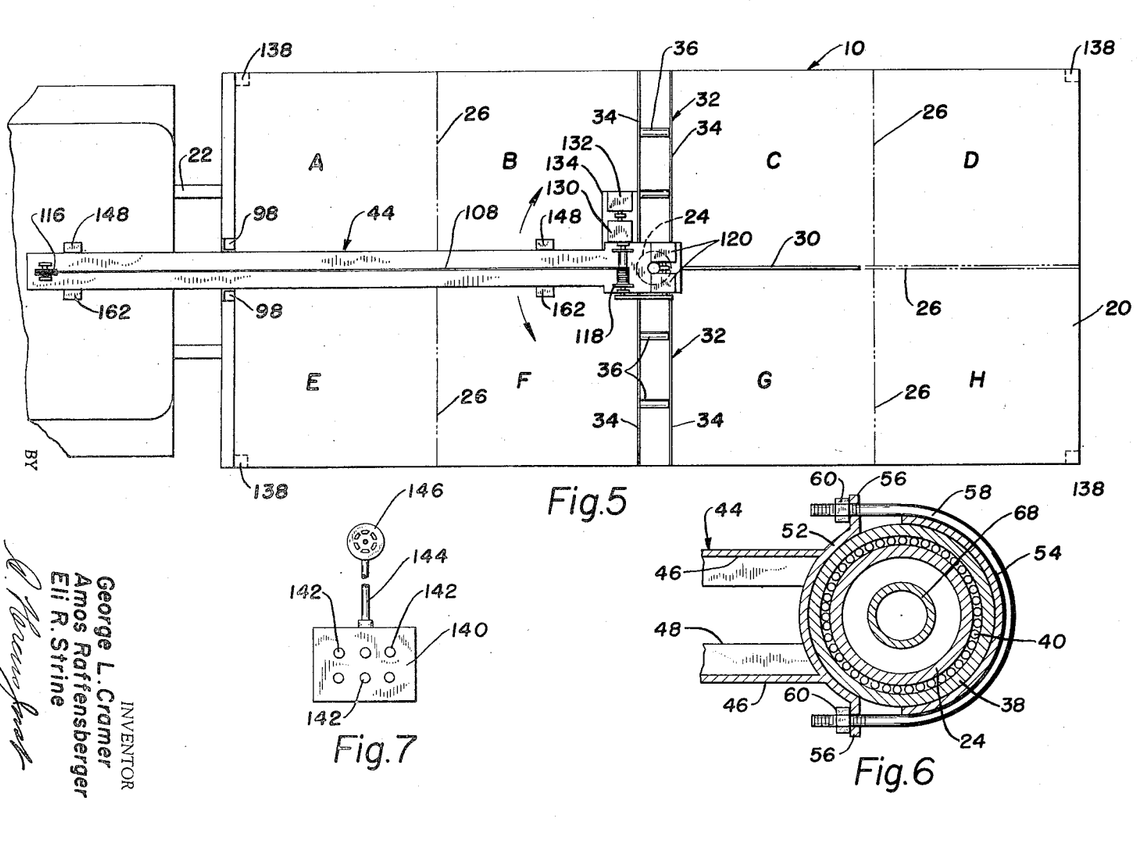
Fig. 5 is a top plan view of the motor truck and hoist assembly illustrated in Fig. 1 but on a slightly larger scale, the front end of the motor truck also being broken away so as to accommodate the figure on the sheet.
Fig. 6 is an enlarged horizontal sectional view showing details of the invention taken on the line 6—6 of Fig. 1.
Fig. 7 is a somewhat diagrammatic elevation of a control box and cable unit by which the operation of the hoist mechanism is controlled, said cable being foreshortened and broken away to minimize the illustration thereof.

In its preferred embodiment, the hoist assembly 14 comprises a tubular mast 24 which, as will be seen particularly from Figs. 1 and 5 preferably is mounted centrally of the bed 20. More importantly however, the mast 24 is mounted so as to intersect normal dividing lines between preferably equal sized units of a load, such, for example, as cubes of cement blocks, an exemplary layout of such cubes of blocks being illustrated in Fig. 5 and identified by letters A through H. Broken lines 26 indicate the division lines between said units of the load.

The lower end of the mast 24 is provided with a flange 28, for example, which is secured to the bed 20 by any suitable means such as welding, bolts, rivets or otherwise. Said mast extends preferably vertically upward from the bed 20 and is braced against swaying by a plurality of braces 30 and brace assemblies 32. The brace assemblies, as well as the braces 30, comprise flat steel plates which extend upward from the bed 20 and inward toward the mast 24, the opposite ends of the braces and brace assemblies respectively being welded to the mast 24 and the bed 20 of the truck. These flat braces 30, as well as the similar members used in the brace assemblies 32, are of any required size of steel plate such as, for example, one-half inch by six inches, but the size of course will depend upon the type of load contemplated to be handled by the hoist assembly.

Brace assemblies 32 each comprise a pair of brace plates 34 which are parallel to each other and similar to the braces 30. The brace plates 34 are spaced apart, as shown in Figs. 1 and 5, a distance substantially equal to the diameter of the mast 24, whereby snug loading of cubes of cement blocks, for example, may be accomplished without the diameter of the mast 24 interfering with such snug and compact loading. Preferably, the brace plates 34 are connected by a plurality of metal struts 36 which may be welded or bolted at their ends to the plates 34.

It is to be understood that, if the diameter of the mast 24 is of sufficiently small diameter, braces 30 may be substituted for the brace assemblies 32. However, when providing a hoist assembly of sufficient strength to accommodate a handle a conventional cube of cement blocks weighing approximately 3,000 pounds, it has been found that a mast of approximately eight inches diameter formed from tubing about one-half inch thick is adequate. These dimensions of course are merely exemplary and not restrictive. Thus, it has been found when using a mast of this diameter, it is preferable to use brace assemblies 32 which not only afford adequate bracing but also permits snug loading of load units such as cubes of cement blocks without resulting in any jostling space being present in the load of such character that the load will tend to slip or become displaced during the hauling thereof.

Figure 4:
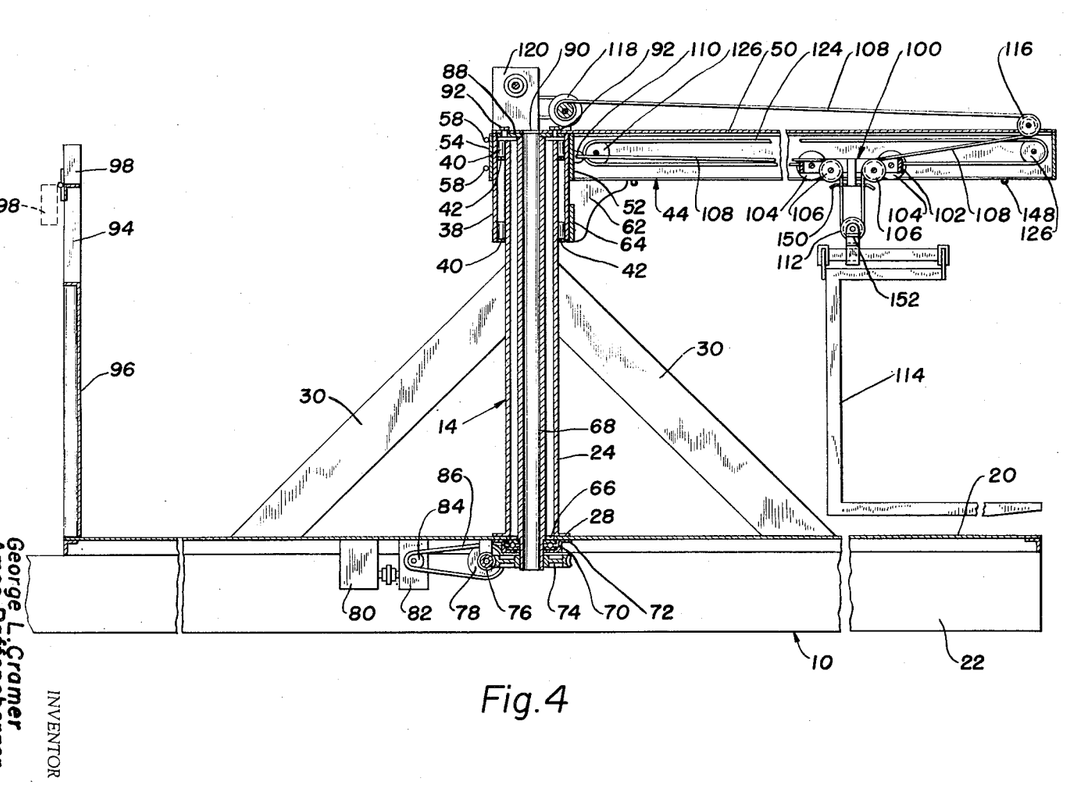
Fig. 4 is a vertical side elevation, in section, and on a larger scale than employed in Fig. 1, illustrating the hoist embodying the invention attached to the bed of a motor truck but illustrating the boom of the hoist assembly extending toward the rear end of the truck rather than toward the front end as shown in Fig. 1.

A relatively short bracing sleeve 38 is disposed concentrically with the mast 24 at the upper end thereof and preferably exteriorly thereon as is best shown in Fig. 4. Needle bearing units 40 are positioned adjacent the opposite ends of bracing sleeve 38 between said sleeve and mast 24 for purposes of affording anti-friction mounting for rotation of the sleeve 38 about the axis of the mast 24. Any suitable annular plates 42 may be used to position the needles of the bearing units 40 within the space provided therefor.

One end of a boom 44 is secured to bracing sleeve 38 so as to extend substantially horizontally and radially from the upper end of said sleeve. For purposes of affording simplicity, strength, and minimum cost to manufacture, the boom 44 is fabricated from a pair of channel members 46 which are disposed with their open faces toward each other and in spaced relationship to each other, whereby a slot 48 is provided in the lower face of the boom 44 as is clearly seen in Figs. 2 and 3. The upper flanges of the channel members 46 are integrally connected to a top plate 50 which is coextensive with the length of the channel members. These elements may be united by welding, for example.

A convenient, simple and inexpensive, yet adequately strong connection for one end of the boom 44 to the bracing sleeve 38 comprises welding an arcuate saddle 52 to said end of the boom 44, said saddle being complementary in shape to the exterior of the bracing sleeve 38 and snugly engaging the same as is clearly shown in Fig. 6. In the preferred construction, a clamping plate 54, also arcuate, engages the opposite side of sleeve 38. Saddle 52 is provided at its opposite ends with laterally extending flanges 56 which are disposed preferably in a common plane and are provided with apertures to receive the ends of a pair of semi-circular clamping bars or hoops 58. The ends of these bars are threaded to receive locking or clamping nuts 60. It will be noted that the clamping means just described is positioned adjacent the upper end of bracing sleeve 38 since such structure is subjected to tension when a load is supported by the boom 44.

Relatively short arcuate braces 62 are secured by welding to the lower surface of the boom 44 and also to another saddle 64 which is similar in shape to the saddle 52 except that no ears are provided thereon. The saddle 64 is in compression at all times against bracing sleeve 38 and engages the lower end portion of said sleeve so as to afford maximum bracing of the boom 44. If desired, the arcuate braces 62 may comprise steel plates of suitable thickness.

The above described means for connecting the boom to the bracing sleeve 38 and mounting the bracing sleeve upon the upper end of the mast comprises the only means in the mechanism for bracing the boom 44 so as to permit complete rotation of such cantilever-type boom through a full 360° about the axis of the mast and has been found to be completely adequate to enable the boom to support substantial loads against any appreciable tilting of the boom, even when the loads are supported by the outer end thereof. Further, it will be noted that the length of the bracing sleeve 38 is relatively short and, in this exemplary illustration of the invention, said sleeve is approximately only about twice as long as the diameter of the mask 24. Further, in the preferred construction of the invention, the upper ends of the braces 30 and brace assemblies 32 are connected to the mast 24 close to the lower end of the bracing sleeve 38, thereby minimizing the height of the mast 24 and the overall hoist assembly. This is obviously particularly from Fig. 1 which represents an accurate dimensional view of an operative unit capable of supporting a minimum of eight cubes of cement blocks of 72 eight inch blocks upon the truck 10.

The bed 20 is provided with an aperture 66 which is concentric with the axis of mast 24 and a rotating member 68 projects at its lower end through aperture 66 and extends upward, axially of mast 24, to the upper end thereof, as is clearly shown in Fig. 4. One race of an anti-friction thrust bearing 70 is connected to the lower end of rotating member 68 so as to support the same against vertical movement. Said thrust bearing is supported by a housing 72 fixed to the undersurface of truck bed 20 and suitable actuating means comprising an exemplary worm gear 74 is keyed to the lower end of rotating member 68. It will be understood of course that any other suitable type of power means for rotating member 68 may be used. In this specific illustration, worm gear 74 is driven by worm 76, the same being actuated by a sprocket gear or pulley 78. Inasmuch as hydraulic fluid is used as the power supplying means in the exemplary illustration shown herein, a hydraulic motor 80 is supported by the lower surface of bed 20 and operates a gear reducing unit 82 by which a sprocket gear or pulley 84 is energized. Sprocket chain or belt 86 connects the gears or pulleys 78 and 84 for driving the worm gear 74.

The upper end of rotating member 68 is connected by a circular plate 88 to the upper end of bracing sleeve 38. Such connection may be by welding and results in the rotating member 68 and bracing sleeve 38 comprising an integral unit. The plate 88 may have a central aperture 90 therein, whereby cables may be passed down through the rotating member 68 which preferably is tubular.

If desired, the connection of the boom 44 to bracing sleeve 38 may be enhanced by extending the plate 50 at its inner end so as to overlap plate 88 and placed so as to be in vertical coincidence therewith, whereby a plurality of stud bolts 92 may extend through openings in plate 50 and into tapped holes in circular plate 88, thereby also aiding the clamping bars or hoops 58 in sustaining tension imposed by a load upon the boom 44. However, by removing bolts 92 and nuts 60 from the ends of the strap-like clamping bars or hoops 58, the boom assembly readily may be disconnected from the bracing sleeve 38. Suitable clearance of course is provided between plate 88 and the upper end of mast 24 in order that there will be no frictional engagement between these elements inasmuch as thrust bearing 70 sustains all vertical load of the boom and any load carrier by the boom.

The mechanism described above is capable of rotating the boom 44 about the axis of mast 24 through a full 360°. From Fig. 5 particularly, it will be seen that the length of the boom 44 is such that it may be projected from either side of the bed 20 of the vehicle and in either direction, or extend rearwardly past the end of the bed 20 but the positioning of the mast 24 preferably centrally of the bed 20 permits the use of a minimum length of boom to achieve these desired results. Further, when the boom is disposed so as to extend forwardly of the bed 20 and be disposed over the cab of the truck 10, as shown in Fig. 1, this position being assumed for example when the truck is empty, the boom 44 preferably may be partially supported by a prop member 94 which extends upwardly and centrally from the forward load limiting panel 96 rising from the bed of the truck. The prop 94 preferably includes a pair of pivotally mounted positioning members 98 which are spaced apart transversely sufficiently to accommodate the width of the boom 44 therebetween as is shown in Fig. 5. When projected upwardly in the full line positions as shown in Fig. 4, these positioning members will serve to prevent lateral movement of the boom 44 relative to prop 94. However, by pivoting one of the members 98 downwardly to the dotted line position shown in Fig. 4, the boom then may be rotated away from prop 94. Any other suitable positioning means may be used, the mechanism described above being primarily exemplary.

As has been stated above, the boom 44 has a slot 48 extending longitudinally along the lower portion thereof. Supported within the boom 44, as shown best in Fig. 4, is a sheave 100 comprising a frame 102 and two pairs of flanged rollers 104 pivotally supported by the frame 102, the flanges of the rollers 104 engaging the edges of the flanges on the channel members 46 which define the slot 48, as is clearly shown in Figs. 2 and 3. Frame 102 also supported a pair of longitudinally spaced wheels 106. Hoisting cable 108 is fixedly connected at one end to a suitable anchor 110 and extends along the boom 44 and downward between pulley wheels 106 to support the pulley 112 connected to an exemplary load engaging member comprising a fork unit 114. Cable 108 then extends around pulley wheel 116 and from there to coiling drum 118 of a winch unit.

The illustration of the winch comprising coiling drum 118 is exemplary and, for convenience, is shown mounted on the upper surface of plate 50 above the mast 24. Drum 118 is driven by an exemplary hydraulic motor and gear reducing unit 120, shown best in Figs. 1 and 5, connected to the winch by a pulley or chain 122. If desired, the coiling drum 118 and the driving means therefor may be mounted below the bed 20 of the truck and, in that event, the hoisting cable 108 would be guided over a pulley wheel disposed above the aperture 90 in plate 50 and then down the tubular rotating member 68 and any suitable guide pulleys at the lower end thereof.

Sheave 100 is propelled longitudinally along the boom 44 by means comprising cable 124 which is connected at its ends to the opposite ends of frame 102 of the sheave, said cable passing around rotatable pulley wheels 126 mounted adjacent opposite ends of the boom. One of the pulley wheels 126 is fixed to its shaft 128, said shaft projecting beyond one side of boom 44 and is connected to a gear reducing unit 130. The unit 130 is driven by an exemplary hydraulic motor 132. The unit 130 and motor 132 may, for convenience, be supported upon a laterally extending plate 134 connected to and supported by the boom 44.

Figure 2:
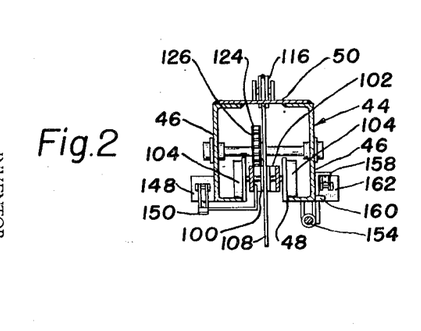
Fig. 2 is a vertical sectional view showing certain details of the invention and taken on the line 2—2 of Fig. 1.
Figure 3:
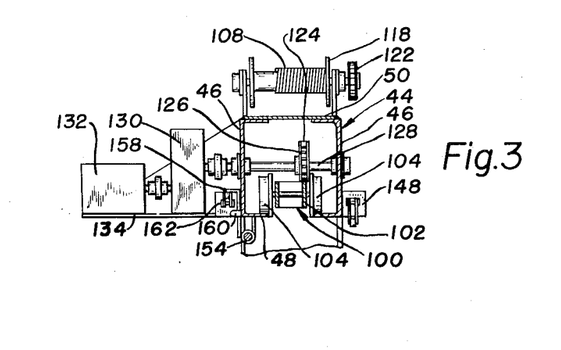
Fig. 3 is a vertical sectional elevation showing other details of the invention and taken on the line 3—3 of Fig. 1.
Figures 8, 9:
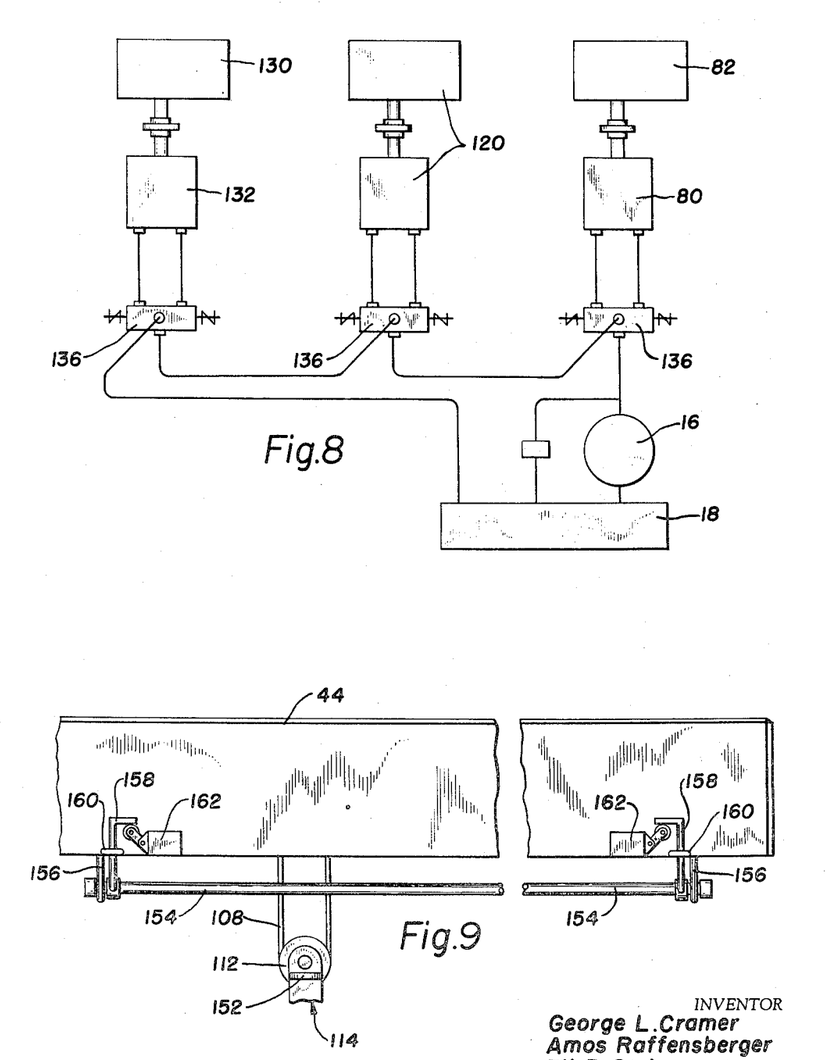
Fig. 8 is a diagrammatic illustration of an exemplary hydraulic power system used to energize and operate the various movable members of the hoist assembly shown particularly in Figs. 1 and 4.
Fig. 9 is a fragmentary side elevation showing some of the safety control mechanism associated with the boom and hoist pulley, the mechanism being broken away to foreshorten the length thereof.

In lieu of pulley wheels 126 and cable 124, said pulley wheels may comprise sprocket wheels and the cable comprise a sprocket chain as shown in Figs. 2 and 3. It will be seen from this illustration that as the motor 132 is rotated in either desired direction, the cable or chain 124 will be caused to move the sheave 100 longitudinally along the boom, carrying the pulley 112 and load supporting unit 114 therewith. A diagrammatic hydraulic supply circuit and control mechanism is illustrated in Fig. 8 although none of the conduits actually are shown in the other figures, it being assumed that conventional conduits will connect the pump 16 to the various fluid motors 80, 120 and 132. Solenoid operated 4-way valves 136 interconnect each of the fluid motors with the fluid line from pump 16 as shown in the diagrammatic circuit of Fig. 8. A conventional electric circuit interconnects the valves 136 to a source of electric power such as the storage battery of the truck or a generator driven by the engine of the truck or other vehicle to which the hoisting assembly is attached. Further, said electric circuit is interconnected to a plurality of outlet boxes 138 which, for convenience, may be mounted at the four corners of the truck bed 20 adjacent the undersurface thereof, or at any other convenient location desired.

Remote control mechanism illustrated diagrammatically and in exemplary manner in Fig. 7 comprises a switch box 140 having, for example, a pair of buttons 142 for each of the valves 136. Thus, three pairs of such buttons are illustrated in Fig. 7. The buttons of each pair respectively will cause the valve with which it is associated to operate respectively in opposite directions to cause the fluid motor controlled thereby to operate in the direction desired, said motors preferably being reversible. As long as the switch button 142 is pressed in, the fluid motor will operate but, as soon as the button is released, the motor will stop. A compound cable 144 connects the switches of box 140 to a polarized receptacle and plug 146 which may be plugged into any one of the outlet boxes 138 on the truck.

The entire operation of the rotation of the boom, longitudinal movement of sheave 100, and operation of the coiling drum 118 is controlled simply by the operation of the switches of box 140 by the truck driver, for example. The box 140 is relatively small in size and readily may be carried by the driver while either loading or unloading the truck and, other than to guide the load supported by the member 114 into its exact spot upon the truck or to the location where it is to be unloaded, no manual handling of the load is required. All operation preferably is remote and completely by push button type switch.

In order that the sheave 100 may not travel farther than intended longitudinally of the boom 44, suitable safety control means are included comprising, for example, limit switches 148 which are connected to the boom 44 adjacent opposite ends thereof as clearly shown in Fig. 1. The actuating arms for said switches are engageable by a longitudinally extending shoe 150 which extends, for example, below the lower surface of the boom 44 and in longitudinal alignment with the ends of the actuating arms of the switches 148 so as to engage the same when the sheave is nearing the end of its travel in either direction, whereupon the circuit to the solenoid operated switch 136 which controls motor 132 will open the circuit to the switch and cause the motor to stop. This will occur regardless of the direction in which the sheave 100 is moving within the boom.

Also, in order that the pulley 112 will not be raised too high and engage the boom 44, for example, and possibly damage either the boom or the pulley, the bracket which supports the pulley 112 carries a laterally projecting lug 152, shown in Figs. 4 and 9, which is engageable with operating bar 154 which preferably extends longitudinally along boom 44 in spaced relationship to the undersurface thereof. A pair of bails 156, for example, support the opposite ends of bar 154 for vertical movement. Fixed to bar 154 adjacent opposite ends thereof also are switch actuating arms 158 which may be suitably guided such as by loops 160 fixed to the boom 44. The arms 158 engage respectively the switch arms of a pair of additional limit switches 162 which may be fixed to boom 44 and are interconnected into the circuit of the solenoid actuated switch 136 that controls the fluid motor 132. Thus, if by accident or carelessness, an operator neglects to notice that the hoisting mechanism is moving the pulley 112 and load supported thereby too close to the boom 44, lug 152 will engage bar 154 and elevate the same, thereby opening one or both of the limit switches 152, the operation of either of which will open the circuit to control switch 136 for the motor 132, thereby stopping the operation of the hoisting cable.

In using and operating the mechanism described hereinabove, an operator may load the truck by manipulating the various control switch buttons 142 of switch 140 to rotate the boom 44 to the vicinity of a pile of cement blocks, propel the load supporting fork 114 relative to a cube or a fraction of a cube of cement blocks so as to project the fingers of the fork into the apertures in the blocks, then operate the control button 142 which will cause the loaded fork to be elevated and, while such elevating is continuing, if desired, the boom 44 may be rotated by pressing the proper control button and the sheave 100 also may be moved in either direction along the boom so as to dispose the blocks carried by the fork 114 upon the bed 20 in the exact location desired. The proper control buttons of the switch box 140 then are operated to withdraw the fork from the loaded blocks and repeat the operation just described until the entire truck bed is loaded. As stated herein above, the positioning of the braces 30 and bracing units 32 is such that equal units of a load, such as a plurality of cubes of cement blocks may be mounted in each quarter of the truck bed 20 as illustrated in an exemplary and diagrammatic manner in Fig. 5.

The fork 114 then may be secured by projecting the same into one of the rearmost cubes of blocks, for example, and also for convenience, the hoisting cable preferably being put under slight tension so as to cause the fork 114 to act somewhat as an anchor for the end of the boom 44 but the boom preferably is held against any movement by the worm and worm gear unit which rotates the same, the motor 80 which drives said unit of course being stopped under these circumstances.

The load is then driven to the site of delivery and, whereas the structure of the hoist assembly permits loading of the truck from either side or the rear end thereof, similarly, the truck may be unloaded from either side or the rear end thereof by reversing the movements described hereinabove relative to loading the truck. It will be seen that the preferably central disposition of the mast 24 permits the use of a minimum length of boom 44 to achieve a maximum amount of travel for the sheave 100 and load supporting member 114 to either side of the truck or from the rear end thereof, such positioning of the load units during unloading taking place with a relatively wide latitude and with substantially no manual effort being required except to slightly rotate the fork 114, for example, about its swivel connection to the pulley 112 in order finally to position the load unit in the exact location desired. Meanwhile, operation of all of the movable members of the hoist assembly are performed simply by operating the required push button 142 of control switch box 140.

One of the principal advantages of utilizing a hoist assembly of the type described above and claimed hereinafter is that not only the loading and unloading time required is extensively reduced over that required for manual loading and unloading, but such loading and unloading takes place with no damage to the cement blocks for example. When cement blocks are loaded and unloaded manually, depending of course upon the care exerted by the workman, a rather high percentage of the blocks incur chipped corners or, not infrequently, the blocks are broken and the value thereof greatly impaired. No jostling or sudden impacts are sustained by cement blocks when loaded and unloaded with the hoist assembly comprising the present invention.

It is to be understood that electric power means may be substituted for the hydraulic power means illustrated and described hereinabove and suitable electrical control switches, similar to those illustrated herein, may be used with equal facility without departing from the spirit of the invention. Further, any suitable type of load supporting means other than the exemplary fork 114 may be suspended from the pulley 112, depending upon the type of items being loaded or otherwise handled by the hoist assembly comprising the present invention.

The unique bracing and pivotal supporting mechanism for the boom produces an extremely simple yet highly effective and rugged means which results in a minimum of height for the mast 24 as well as a minimum of interference with the load upon the truck and no interfering bracing mechanisms or cables are required such as might interfere with the full rotation of the boom about the axis of the mast. Thus, maximum maneuverability of the hoisting assembly is provided with the simplest of mechanism and the least possible elevation of the mechanism above the top of the load carried upon the bed of the vehicle.

The novel bracing of the boom and the disposition thereof relative to the mast and vehicle bed results in providing a maximum of pay load area for the vehicle as well as aiding in positioning uniform sized units of load upon the vehicle bed.

While the invention has been shown and illustrated in its preferred embodiments, and has included certain details, it should be understood that the invention is not to be limited to the precise details herein illustrated and described since the same may be carried out in other ways falling within the scope of the invention as claimed.

We claim:

1. A hoist attachable to the bed of a vehicle and comprising in combination a hollow mast having a cylindrical upper portion and constructed and arranged to be fixed at its lower end to said vehicle bed and extend vertically upward therefrom, a substantially relatively short cylindrical bracing sleeve concentrically surrounding and extending downward from the upper end of said mast in spaced relationship thereto, two sets of anti-friction rotating members positioned within the space between said sleeve and mast respectively adjacent opposite ends of said sleeve, a cantilever boom having one end abutting said bracing sleeve, means rigidly connecting said abutting end of said boom to said sleeve adjacent the upper end thereof and said boom extending substantially horizontally outward from said sleeve, said boom having a cross-sectional heighth less than the length of said sleeve, a compact bracing bracket extending between the lower surface of said boom and the lower end of said sleeve and secured thereto, mast-bracing members extending angularly outward and downward from said mast directly beneath the lower end of said sleeve and connected at the lower ends thereof to the bed of said vehicle, the height of said mast and position of said boom on said bracing sleeve affording clearance for said boom above a load of material upon said vehicle bed when loaded and said bracing sleeve and connecting means constituting the sole means preventing tilting of said boom relative to said mast, a load supporting sheave mounted upon said boom for longitudinal movement therealong between the ends thereof, and means interconnected to said boom and sleeve and operable to rotate the same in either direction about the axis of said mast.

2. A hoist attachable to the bed of a vehicle and comprising in combination a strong hollow mast having a cylindrical upper end and constructed and arranged to be fixed at its lower end to said vehicle bed and extend vertically upward therefrom, a relatively short bracing sleeve surrounding and extending downward from the upper end of said mast, anti-friction bearings positioned between the interior of said sleeve and exterior of said mast at opposite ends of said sleeve, a cantilever boom, means connecting one end of said boom in abutting relationship to said sleeve adjacent the upper end thereof and said boom extending substantially outward from said sleeve, said bracing sleeve and connecting means constituting the sole means resisting tilting of said boom relative to said mast, a member extending upward interiorly through said mast to support said bracing sleeve and boom vertically, means spaced above the upper end of said mast and fixedly interconnecting the upper end of said member to the upper end of said bracing sleeve, a thrust bearing supported by said vehicle bed below the load receiving surface thereof and engaging the lower end of said member to support said lower end thereof and permit rotation of said member and boom about the axis of said mast, and means interconnected to said member below and closely adjacent said thrust bearing and operable to so rotate said member and boom.

3. The hoist structure set forth in claim 2 further characterized by said boom being fabricated from structural beam members and including a plate extending longitudinally along the upper portion of the boom and one end of said plate overlapping the means interconnecting said rotating member and bracing sleeve, and means connecting said overlapping end of said plate to said means.

4. A hoist attachable to the bed of a vehicle and comprising in combination a hollow mast constructed and arranged to be fixed at its lower end to said vehicle bed and extend vertically upward therefrom, a relatively short bracing sleeve surrounding and extending downward from the upper end of said mast, anti-friction bearings positioned between the interior of said sleeve and exterior of said mast at opposite ends of said sleeve, a cantilever boom, means connecting one end of said boom in abutting relationship to said sleeve adjacent the upper end thereof and said boom extending substantially horizontally outward from said sleeve, the height of said mast and position of said boom on said sleeve affording clearance for said boom above a load of material upon said vehicle bed when loaded with a minimum amount of excess height of said mast above said load and said bracing sleeve and connecting means constituting the sole means preventing tilting of said boom relative to said mast, a load supporting means carried by said boom, means extending upward interiorly through said mast and interconnected at its upper end to said boom and operable to rotate the same, a thrust bearing supported by said vehicle bed below the load receiving surface thereof and rotatably supporting the lower end of said rotating means and boom against downward vertical movement, and power driven means mounted below the bed of said vehicle and interconnected to the lower end of said rotating means and operable to rotate the same and said boom selectively in either direction about the axis of said mast.

5. A hoist attachable to the bed of a vehicle and comprising in combination a hollow mast constructed and arranged to be fixed at its lower end to said vehicle bed and extend vertically upward therefrom, a relatively short bracing sleeve surrounding and extending downward from the upper end of said mast, anti-friction bearings positioned between the interior of said sleeve and exterior of said mast at opposite ends of said sleeve, a cantilever boom, comprising a pair of channel members arranged with the open faces toward each other and spaced apart to provide slots between the flange edges of said channel members, a plate substantially coextensive in length with said channel members and extending across one of said slots, said plate being fixed to the channel member flanges defining said slot and said boom being positioned in use so that said plate forms the upper surface thereof, whereby the other slot is in the lower surface of said boom, means connecting one end of said boom to said sleeve adjacent the upper end thereof and said boom extending substantially horizontally outward from said sleeve, said bracing sleeve and connecting means constituting the sole means preventing tilting of said boom relative to said mast, a load supporting sheave mounted within said boom for longitudinal movement therealong between the ends thereof and including flanged rollers engageable with the slot defining edges of said boom, load supporting pulley means interconnected to said sheave and extending through said slot in said boom, and means operable to propel said sheave along said boom.

6. A hoist attachable to the bed of a vehicle and comprising in combination a hollow mast having a cylindrical upper portion constructed and arranged to be fixed at its lower end to said vehicle bed and extend vertically upward therefrom, a relatively short cylindrical bracing sleeve surrounding the upper cylindrical portion of said mast in spaced relationship thereto and extending downward from the upper end of said mast, anti-friction roller bearings rotatable about axes parallel to said mast and positioned between the interior of said sleeve and exterior of said mast at opposite ends of said sleeve, a cantilever boom having one end abutting the upper exterior portion of said sleeve, strap-like means extending around part of said bracing sleeve and interconnected to one end of said boom to secure said end of said boom abuttingly against said sleeve adjacent the upper end thereof, short bracing bracket means extending downwardly from the undersurface of said boom adjacent the inner end thereof toward the lower end of said bracing sleeve, concave saddle means fixed to said one end of said boom and lower end of said bracket means and positioned to engage the exterior of said cylindrical bracing sleeve, the lower portion of said saddle means engaging said bracing sleeve in compression adjacent the lower end thereof and said boom extending substantially horizontally outward from said sleeve, said bracing sleeve and braced connecting means constituting the sole means resisting tilting of said boom relative to said mast, a load supporting sheave mounted upon said boom for longitudinal movement therealong between the ends thereof, and means interconnected to said boom and operable to rotate it in either direction about the axis of said mast.

7. A hoist attachable to the bed of a vehicle and comprising in combination a hollow mast constructed and arranged to be fixed at its lower end to said vehicle bed and extend vertically upward therefrom, a relatively short bracing sleeve surrounding and extending downward from the upper end of said mast, anti-friction bearings positioned between the interior of said sleeve and exterior of said mast at opposite ends of said sleeve, a cantilever boom, means connecting one end of said boom to said sleeve adjacent the upper end thereof and said boom extending substantially horizontally outward from said sleeve, the height of said mast and position of said boom on said sleeve affording clearance for said boom above a load of material upon said vehicle bed when loaded and said bracing sleeve and connecting means constituting the sole means preventing tilting of said boom relative to said mast, a load supporting sheave mounted upon said boom for longitudinal movement therealong between the ends thereof, power means operable to propel said sheave along said boom, control means for said power means positioned on said boom adjacent opposite ends thereof, means on said sheave engageable with said control means as said sheave approaches one end or the other of said boom to actuate one of said control means and stop the operation of said power means, and power means interconnected to said boom and operable to rotate it in either direction about the axis of said mast.

8. A hoist attachable to the bed of a vehicle and comprising in combination a hollow mast constructed and arranged to be fixed at its lower end to said vehicle bed and extend vertically upward therefrom, a relatively short bracing sleeve surrounding and extending downward from the upper end of said mast, anti-friction bearings positioned between the interior of said sleeve and exterior of said mast at opposite ends of said sleeve, a cantilever boom, means connecting one end of said boom to said sleeve adjacent the upper end thereof and said boom extending substantially horizontally outward from said sleeve, the height of said mast and position of said boom on said sleeve affording clearance for said boom above a load of material upon said vehicle bed when loaded and said bracing sleeve and connecting means constituting the sole means preventing tilting of said boom relative to said mast, a load supporting sheave mounted upon said boom for longitudinal movement therealong between the ends thereof, power means operable to propel said sheave along said boom, control means for said power means positioned on said boom adjacent opposite ends thereof, and means on said sheave engageable with said control means as said sheave approaches one end or the other of said boom to actuate one of said control means and stop the operation of said power means, a hoisting cable and hoisting pulley operable relative to said sheave, power means operable to move said pulley vertically in opposite directions relative to said sheave, control means for said pulley power means interconnected to said boom and extending longitudinally therealong, means movable with said pulley during vertical movement thereof and operable near the uppermost intended movement of said pulley to engage said control means at any normal position of said sheave along said boom and stop the operation of said pulley power means, and means interconnected to said boom and operable to rotate it in either direction about the axis of said mast.

9. A load supporting bed of a vehicle in combination with a hoist attachable thereto and comprising a mast extending substantially vertically upward therefrom and positioned inward from the ends and sides of said bed between load units of substantially uniform size when said bed is loaded, flat elongated braces extending upward from said vehicle bed and inward toward the upper portion of said mast and the opposite ends of said braces being fixed respectively to said bed and mast, said flat braces being disposed within vertical planes radiating outwardly from the axis of said mast with substantially equal angles between all braces and in vertical coincidence with the vertical boundary planes between said load units, whereby no appreciable load occupying area of said vehicle bed is consumed by said braces and mast and the latter is positioned substantially within the outer boundaries of a load upon said bed when substantially fully loaded, a boom extending radially outward from the upper end of said mast and rotatable substantially horizontally about the axis thereof, and load hoisting and carrying means supported by said boom and engageable with units of said load and operable to hoist the same to load them onto or unload them from said vehicle with a minimum of required length of boom.

10. The combination set forth in claim 9 further characterized by a pair of said braces extending parallel to the longitudinal axis of said bed and another pair extending transversely thereto, whereby the bed of said vehicle is divided into four substantially similar load receiving areas.

11. A load supporting bed of a vehicle in combination with a hoist attachable thereto and comprising a cylindrical mast extending substantially vertically upward therefrom and positioned inward from the ends and sides of said bed between load units of substantially uniform size when said bed is loaded, flat elongated braces extending from said vehicle bed and inward toward the upper portion of said mast and the opposite ends of said braces being fixed respectively to said bed and mast, said flat braces being disposed within vertical planes radiating outwardly from the axis of said mast with substantially equal angles between all braces and in vertical coincidence with the vertical boundary planes between said load units, whereby no appreciable load occupying area of said vehicle bed is consumed by said braces and mast and the latter is positioned within the outer boundaries of a load upon said bed when substantially fully loaded, a bracing sleeve surrounding said mast and extending downward from the top thereof but terminating adjacent the upper ends of said braces, anti-friction bearing means between said sleeve and mast adjacent opposite ends of said sleeve, a boom connected at one end to and extending radially outward from the upper portion of said bracing sleeve and rotatable about the axis of said mast and load hoisting and carrying means supported by said boom and engageable with units of said load and operable to hoist the same to load them onto or unload them from said vehicle with a minimum of required length of boom.

12. A load supporting bed of a vehicle in combination with a hoist attachable thereto and comprising a cylindrical mast extending substantially vertically upward therefrom and substantially centrally thereof and between units of a load substantially uniform in size, a pair of flat elongated braces respectively extending upward from said vehicle bed with a vertical plane extending along one axis of said bed and inward toward the upper portion of said mast from opposite sides thereof, a pair of brace units each comprising a pair of parallel flat braces spaced apart a distance equal substantially to the diameter of said mast and disposed within a vertical plane transverse to said other vertical plane and extending upward from the vehicle bed and inward toward said mast, said braces and brace units radiating outwardly from the axis of said mast with substantially equal angles therebetween and said braces and brace units also being substantially in vertical coincidence with the vertical boundary planes between said load units, whereby no appreciable load occupying area of said vehicle bed is consumed by said braces and mast and the latter is positioned within the outer boundaries of a load upon said bed when substantially fully loaded, a boom extending radially outward from the upper end of said mast and rotatable about the axis thereof, and load supporting means carried by said boom for engagement with units of said load and operable to hoist the same to load them onto or unload them from said vehicle with a minimum of required length of boom.

References Cited in the file of this patent

UNITED STATES PATENTS

| | | |
|---|---|---|
| 2,082,017 | McClain | June 1, 1937 |
| 2,101,839 | Crawford | Dec. 14, 1937 |
| 2,478,094 | Gelbman | Aug. 2, 1949 |
| 2,519,910 | Kershaw | Aug. 22, 1950 |
| 2,629,506 | Meitz | Feb. 24, 1953 |
| 2,646,180 | Schlough et al. | July 21, 1953 |
| 2,670,086 | Eisberg | Feb. 23, 1954 |